Patented Oct. 19, 1926.

1,603,502

UNITED STATES PATENT OFFICE.

DANIEL B. W. ALEXANDER, OF SPRINGFIELD, MASSACHUSETTS.

METHOD OF MANUFACTURING IMPROVED BITUMINOUS PRODUCT.

No Drawing.    Application filed May 4, 1926.  Serial No. 106,756.

My invention relates to improvements in the method of manufacturing an improved bituminous product or other substance from the residuum which is the product of a distillation process such as the residuum obtained from the distillation of crude petroleum oils, or from coal tar products, or other organic substances obtained in like manner.

While I will describe my invention in connection with the manufacture of asphalt which is a product of the distillation of certain crude petroleum oils, it is understood that the invention may be applied to the manufacture of any other similar substances which are produced in other distillation processes.

In the manufacture of asphalt, it is known that the addition of extremely fine particles of earthy or mineral material tends to render the asphalt more enduring, less plastic and less liable to displacement when used for certain purposes such as pavements and so forth, and it is also known that if such particles are completely dispersed throughout the resultant mass the above results are substantially increased.

Many attempts have been made to introduce such particles in as complete a state of dispersion as is found in some natural asphalts, such as Trinidad asphalt, but so far such attempts have not been a commercial success due to the imperfect results obtained and to the expense incurred in the particular method employed. According to my method, however, I obtain a high degree of dispersion of the finely divided material in the asphalt without any additional cost in the usual method of manufacturing asphalt as my method does not interfere with the regular distillation process of crude petroleum oils, nor require any additional equipment to same.

As illustrated in the manufacture of asphalt refined from crude petroleum oils, my invention consists in the particular manner and means by which I disperse finely divided particles of vegetable or mineral material throughout the asphalt thus obtained whereby a complete dispersion of the particles throughout the resultant asphalt is very easily and readily accomplished during the regular course of the distillation of the petroleum.

For the fine particles of vegetable or mineral matter, I have found that they may consist of such material as wood pulp, lampblack, ground silica, Tripoli, slaked lime, or like material in a finely divided state, the kind and amount depending upon the use for which the asphalt is to be used. With such particles, I make an oily slurry with a liquid such as kerosene, gasolene, naphtha, benzine, etc., that is a liquid which is miscible with the petroleum which is being distilled and which liquid itself is capable of being distilled during the regular process of distillation. In the use of kerosene, I have found that it will penetrate into a mass of fine particles of mineral matter, such as dry dust, just as far as the adhesion of the particles allows, thereby effecting a minute separation of each particle in the oily slurry; while with such a liquid as water, under similar conditions, the water does not penetrate but remains as a globule not separating the particles from one another.

The above oily slurry is prepared of the proper consistency of finely divided particles and kerosene to obtain the desired results in the resultant asphalt, and is then introduced into the still during the regular course of the distillation of the petroleum or preferably the slurry may be introduced into the charging line of the still in the manner hereinafter described. The contents of the still are preferably being agitated all the time by steam or air through the usual agitator pipes at the bottom of the still in the manner and as is common in the manufacture of asphalt. The agitation thoroughly mixes the oily slurry in which the finely divided particles are highly dispersed throughout the contents of the still, this mixture being easily and readily accomplished due to the miscibility of the kerosene and petroleum whereby the finely divided particles are very highly dispersed throughout the contents of the still. The regular course of distillation is continued until the asphalt reaches the desired consistency for the use to which it is intended; the kerosene in the oily slurry, in the meantime, being distilled off and recovered and used repeatedly. In the use of kerosene or other liquids miscible with petroleum, as the vehicle in which the finely divided particles are first dispersed, it will be observed that the asphalt very easily and readily replaces the kerosene when the latter is distilled off during the regular distillation process, leaving the finely divided particles in a very complete state of dispersion throughout the asphalt.

In case the oily slurry is introduced into the regular charging line of the still, that is, into the crude petroleum before the latter enters the still, the mixed slurry and petroleum is preferably first passed through a preheater, heat exchanger or dehydrator connected with the condenser of the still and then the whole mass is introduced into the still, whereby the whole mass may receive the usual agitation as soon as it enters the still. Otherwise, in the case of steam agitation, it is undesirable to commence such agitation until the contents of the still have reached such a temperature that the water in the petroleum has been driven off so that the steam will not condense on entering the still. Thus, by introducing the slurry into the charging line, the petroleum and slurry are mixed to a certain degree while passing through the preheater and charging line and are immediately agitated as soon as they enter the still, thereby effecting a quicker and more efficient dispersion of the finely divided particles in the still.

While I have used kerosene in the illustration of my invention as the vehicle in which to disperse the finely divided particles, it is readily apparent that a heavier vehicle, such as a gas oil or a light lubricating oil, may be used; and when the finely divided particles consist of a heavier material than those already mentioned, such as limestone or Portland cement, it is preferable to use such a heavier vehicle as the latter tends to prevent the particles of heavier material from settling out from the petroleum in the still which would be the case if the particles of heavier material were dispersed in a light vehicle such as kerosene.

Asphalt made according to my invention is suitable for all the various uses for which asphalt is generally employed and the use of my improved asphalt in street and highway construction is extremely advantageous. In a paving mixture of ordinary asphalt and the usual mineral aggregate, the dispersion of the finely divided particles of the latter in the asphalt cannot be effected mechanically as completely or to such an extent as by my method.

In the formation of a paving mixture, a mineral aggregate is mixed with the asphalt; but when the ordinary petroleum asphalt is employed, a much larger quantity of finely divided particles or dust must be added to the mixture than when the asphalt prepared according to the present invention is used, since the latter will contain in a most thoroughly dispersed condition all, or nearly all, the necessary quantity of the dust or finely divided particles required for the paving mixture. Furthermore, it has been found quite impossible to obtain as thorough a dispersion of the dust when mixing the same with a mineral aggregate, and a previously formed petroleum asphalt as has been obtained by my method wherein the dust is mixed therewith during the refining of the asphalt. The stability of a pavement is greatly increased by the use of asphalt prepared according to the present invention on account of the high frictional resistance due to the complete dispersion of the finely divided particles.

What I claim is:

1. The method of obtaining an improved bituminous product or other similar substance from a distillation process or the residuum therefrom, which consists in charging the still, preparing a slurry of finely divided particles of material and a liquid which is miscible with the charge to be distilled, introducing said slurry into the still for mixture with the charge thereof, and distilling said mixture.

2. The method of obtaining an improved bituminous product or other similar substance from a distillation process or the residuum therefrom, which consists in charging the still, preparing a slurry of finely divided particles of material and a liquid which is miscible with the charge to be distilled, introducing said slurry into the still for mixture with the charge thereof, and distilling said mixture while simultaneously agitating the same.

3. The method of obtaining an improved bituminous product or other similar substance from a distillation process or the residuum therefrom, which consists in preparing a slurry of finely divided particles of material and a liquid which is miscible with the charge to be distilled, effecting a mixture of said slurry and charge by introducing the same simultaneously through a common charging line and preheating said mixture prior to its introduction into the still, and distilling said mixture while simultaneously agitating the same.

4. The method of obtaining an improved asphalt product from the distillation of petroleum which consists in charging the still, preparing a slurry of finely divided particles of mineral matter and a liquid such as kerosene, introducing said slurry into said still for mixture with the charge thereof, and distilling said mixture.

5. The method of obtaining an improved asphalt product from the distillation of petroleum which consists in charging the still, preparing a slurry of finely divided particles of mineral matter and a liquid such as kerosene, introducing said slurry into said still for the mixture with the charge thereof and distilling said mixture while simultaneously agitating the same.

In testimony whereof I have affixed my signature.

DANIEL B. W. ALEXANDER.